(12) United States Patent
Gubbi Lakshminarasimha et al.

(10) Patent No.: US 11,631,247 B2
(45) Date of Patent: Apr. 18, 2023

(54) SYSTEM AND METHOD TO CAPTURE SPATIO-TEMPORAL REPRESENTATION FOR VIDEO RECONSTRUCTION AND ANALYSIS

(71) Applicant: Tata Consultancy Services Limited, Mumbai (IN)

(72) Inventors: Jayavardhana Rama Gubbi Lakshminarasimha, Bangalore (IN); Akshaya Ramaswamy, Chennai (IN); Balamuralidhar Purushothaman, Bangalore (IN); Aparna Kanakatte Gurumurthy, Bangalore (IN); Avik Ghose, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 265 days.

(21) Appl. No.: 17/197,316

(22) Filed: Mar. 10, 2021

(65) Prior Publication Data

US 2022/0019804 A1    Jan. 20, 2022

(30) Foreign Application Priority Data

Jul. 1, 2020  (IN) .............................. 202021028074

(51) Int. Cl.
*G06V 20/40* (2022.01)
*G06K 9/62* (2022.01)
*G06N 3/08* (2023.01)

(52) U.S. Cl.
CPC ........... *G06V 20/41* (2022.01); *G06K 9/6232* (2013.01); *G06K 9/6261* (2013.01);
(Continued)

(58) Field of Classification Search
CPC ........ G06V 20/41; G06V 20/46; G06V 20/40; G06K 9/6232; G06K 9/6261; G06K 9/6268; G06N 3/08; G06N 3/0445; G06N 3/0454
See application file for complete search history.

(56) References Cited

U.S. PATENT DOCUMENTS

2020/0034627 A1\*  1/2020  Zhu ......................... G06V 20/41
2020/0234066 A1\*  7/2020  Lee ...................... G06K 9/6228
(Continued)

OTHER PUBLICATIONS

Colleoni et al., "Deep learning based robotic tool detection and articulation estimation with spatio-temporal layers," IEEE Robotics and Automation Letters (2019).
(Continued)

*Primary Examiner* — Dhaval V Patel
(74) *Attorney, Agent, or Firm* — Finnegan, Henderson, Farabow, Garrett & Dunner LLP

(57) ABSTRACT

State of the art techniques in the domain of video analysis have limitations in terms of capability to capture spatio-temporal representation. This limitation in turn affects interpretation of video data. The disclosure herein generally relates to video analysis, and, more particularly, to a method and system for video analysis to capture spatio-temporal representation for video reconstruction and analysis. The method presents different architecture variations using three main deep network components: 2D convolution units, 3D convolution units and long short-term memory (LSTM) units for video reconstruction and analysis. These variations are trained for learning the spatio-temporal representation of the videos in order to generate a pre-trained video analysis module. By understanding the advantages and disadvantages of different architectural configurations, a novel architecture is designed for video reconstruction. Using transfer learning, the video reconstruction pre-trained model is extended to
(Continued)

other video applications such as video object segmentation and surgical video tool segmentation.

7 Claims, 15 Drawing Sheets

(52) U.S. Cl.
CPC ............. *G06K 9/6268* (2013.01); *G06N 3/08* (2013.01); *G06V 20/46* (2022.01)

(56) References Cited

U.S. PATENT DOCUMENTS

2020/0242382 A1* 7/2020 Yin ...................... G06K 9/6256
2022/0012898 A1* 1/2022 Carreira ................... G06T 5/50

OTHER PUBLICATIONS

Sarikaya et al., "Surgical Activity Recognition Using Learned Spatial Temporal Graph Representations of Surgical Tools," IEEE Transactions on Medical Imaging (2020).

Zhou et al., "Motion-Attentive Transition for Zero-Shot Video Object Segmentation," Association for the Advancement of Artificial Intelligence (2020).

* cited by examiner

Hook

Grasper

Clipper

Bipolar

Specimen Bag

Scissor

Irrigator

SYSTEM AND METHOD TO CAPTURE SPATIO-TEMPORAL REPRESENTATION FOR VIDEO RECONSTRUCTION AND ANALYSIS

CROSS-REFERENCE TO RELATED APPLICATIONS AND PRIORITY

This U.S. patent application claims priority under 35 U.S.C. § 119 to India Application No. 202021028074, filed on Jul. 1, 2020. The entire content of the abovementioned application is incorporated herein by reference.

TECHNICAL FIELD

The disclosure herein generally relates to video analysis, and, more particularly, to a method and system to capture spatio-temporal representation for video reconstruction and analysis.

BACKGROUND

Video analysis is increasingly becoming possible with improvement in hardware and deep learning algorithms. Videos contain the spatial as well as the temporal information that come closest to the real-world visual information representation. Image-based deep networks have been modified and extended to work on video, and optical flow between the frames has been utilized to capture temporal variations. Video analysis is a process of analyzing video to extract information, and such information extracted via the video analysis may be further used in a variety of applications. While analyzing the video, a system performs object segmentation, detection, localization, and identification of actions, so as to determine context of the video, and to extract one or more required details from the video.

There is still a gap in understanding whether such networks capture the spatio-temporal representation collectively. Instead of focusing on discrimination as the final goal, the proposed method approaches the problem as a video reconstruction problem.

SUMMARY

Embodiments of the present disclosure present technological improvements as solutions to one or more of the above-mentioned technical problems recognized by the inventors in conventional systems. For example, in one embodiment, a processor implemented method capture spatio-temporal representation for video reconstruction and analysis is provided. In this method, a video is collected as input for analysis, via one or more hardware processors. The video is split to a plurality of frames of fixed length, via the one or more hardware processors. Further, a spatial information for each of the plurality of video frames is captured by processing predefined sequence of each video frame using a two-dimensional (2D) convolution unit, via the one or more hardware processors. Further, an optical flow information for each of the plurality of video frames is captured, via the one or more hardware processors. Furthermore, the plurality of video frames is encoded via an encoder network to capture spatio-temporal representation from each video frame. Wherein, the encoder network is processing the predefined sequence of video frames to capture a first set of spatio-temporal features using the three-dimensional (3D) convolution unit network, the captured optical flow information of the predefined sequence of video frames to capture a second set of spatio-temporal features using the three-dimensional (3D) convolution unit network, and then concatenating the captured first set and second set of spatio-temporal features to get combined short-term spatio-temporal information of the predefined sequence of video frames. Further, the encoder network processes the combined short-term spatio-temporal information using a Long Short-Term Memory (LSTM) unit network to capture a spatio-temporal representation spanning a longer duration.

It would be appreciated that the combined spatio-temporal features are of short-term, a first-time duration. Therefore, the captured spatio-temporal features of the first-time duration is further processed with the LSTM to capture a spatio-temporal representation spanning a second-time duration, a longer duration. Further, a decoder network reconstructs one or more details from each of the plurality of video frames by processing the captured spatio-temporal representation via a combination of a 3D transpose convolution unit and a 3D convolution unit and concatenating the captured spatial information to one or more predefined layers of the decoder network, via the one or more hardware processors.

In another embodiment, a processor implemented method for segmentation and classification of a plurality of surgical tools used in a surgery is provided. The processor implemented method includes receiving a video of a surgery as an input data, splitting the received video to the plurality of video frames of fixed length, and fine-tuning a pre-trained neural network for segmentation of the plurality of surgical tools, via one or more hardware processors. Wherein, the fine-tuning includes freezing one or more model weights of each layer of the encoder network and predefined layers of the decoder network, adding one or more layers of the 3D convolution unit and a softmax unit to the neural network to map spatio-temporal representation to tool segmentation masks for each of the plurality of input video frames and updating one or more model weights of unfrozen layers and the added one or more layers during training to generate the fine-tuned neural network. Further, the method includes generating segmentation mask for each of the plurality of the video frames and for each of the plurality of surgical tools using the fine-tuned neural network and training fine-tuned neural network to classify the plurality of surgical tools, via one or more hardware processors. The trained neural network is used to classify each of the plurality of surgical tools using the trained neural network.

In yet another embodiment, a system to capture spatio-temporal representation for video reconstruction and analysis is provided. The system includes one or more hardware processors, one or more communication interfaces, and a memory. The memory includes a plurality of instructions, which when executed, cause the one or more hardware processors to collect a video as an input data via the one or more communication interfaces for capturing spatio-temporal representation of each frame of the video. Steps executed by the system, using the one or more hardware processors, during the video analysis are explained further. The video is split into a plurality of video frames of fixed length, via the one or more hardware processors. Further, spatial information for each frame is captured by processing predefined sequence of each video frame using a 2-Dimensional (2D) convolution unit, via the one or more hardware processors. Further, the plurality of video frames are encoded via an encoder network to capture spatio-temporal information from each video frame, by processing each frame using a 3D convolution unit among a plurality of 3D convolution units in a 3D convolution network, via the one or more hardware processors. It would be appreciated that the captured spatio-temporal information is of short-term. Therefore, the captured spatio-temporal information of short-term is further processed with a Long Short-Term Memory (LSTM) to capture a spatio-temporal information spanning a longer duration, via the one or more hardware processors. Further, a decoder network reconstructs one or more details from each of the plurality of video frames by processing the captured spatio-temporal information from LSTM via a combination of a 3D transpose convolution unit and a 3D convolution unit and concatenating the captured spatial information to one or more predefined layers of the decoder network, via the one or more hardware processors.

In another embodiment, a neural network is trained for capturing spatio-temporal representation from a video input is provided. An input layer of the neural network includes a plurality of input blocks, and each of the plurality of input blocks collects one frame each, from among a plurality of frames of fixed length of the video input. A 2D convolution unit of the neural network extract a spatial information from each of the plurality of frames of the video input. Further, a 3D convolution layer of the neural network includes a plurality of 3D convolution units, wherein the 3D convolution layer captures a spatio-temporal information from each of the plurality of frames of the video input. It would be appreciated that the captured spatio-temporal information is of short-term. Therefore, the captured spatio-temporal information of short-term is further processed with a Long Short-Term Memory (LSTM) to capture a spatio-temporal information spanning a longer duration. Further, a decoder of the neural network reconstructs one or more details from each of the plurality of video frames by processing the captured spatio-temporal information from LSTM via a combination of a 3D transpose convolution unit and a 3D convolution unit. Further, the captured spatial information is concatenated to one or more predefined layers of the decoder, via the one or more hardware processors and the neural network generates a data model using the spatio-temporal information.

In yet another embodiment, a system for segmentation and classification of a plurality of surgical tools used in a surgery is provided. The system includes one or more hardware processors, one or more communication interfaces, and a memory. The memory includes a plurality of instructions, which when executed, cause the one or more hardware processors to collect a surgery video as an input data via the one or more communication interfaces for segmentation and classification of a plurality of surgical tools used in the surgery. Steps executed by the system, using the one or more hardware processors, during the video analysis are explained further. The system is configured to split the received video to the plurality of video frames of fixed length and fine-tune a pre-trained neural network for segmentation of the plurality of surgical tools. Further, the system is configured to generate a segmentation mask for each of the plurality of the video frames and for each of the plurality of surgical tools using the fine-tuned neural network, and train the fine-tuned neural network to classify the plurality of surgical tools by adding one or more 2D convolution unit layers and one or more fully connected unit layers that make use of the generated segmentation mask to classify the plurality of surgical tools in each of the plurality of the video frames.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
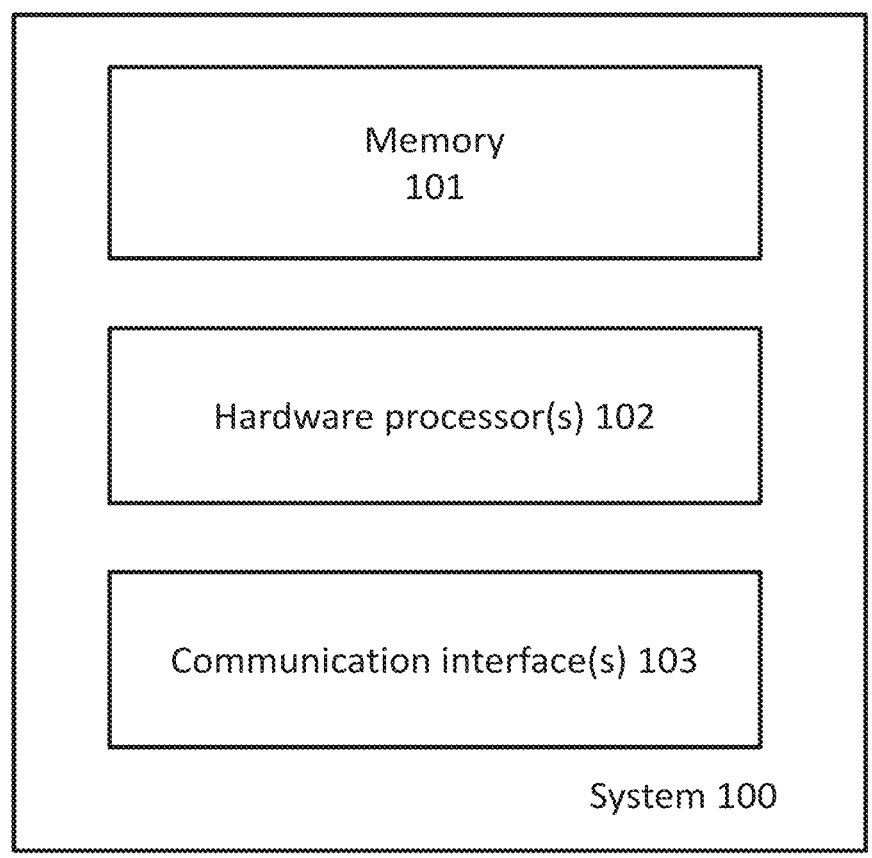
FIG. 1 illustrates an exemplary system to capture spatio-temporal representation for video reconstruction and analysis, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 13, where similar reference characters denote corresponding features consistently throughout the figures, there are shown preferred embodiments and these embodiments are described in the context of the following exemplary system and/or method.

FIG. 1 illustrates an exemplary system for video object segmentation, according to some embodiments of the present disclosure. The system (100) includes one or more hardware processors (102), communication interface(s) or input/output (I/O) interface(s) (103), and one or more data storage devices or memory (101) operatively coupled to the one or more hardware processors (102). The one or more hardware processors (102) can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system (100) can be implemented in a variety of computing systems, such as laptop computers, notebooks, hand-held devices, workstations, mainframe computers, servers, a network cloud, and the like. The one or more hardware processors (102) can be implemented in the form of a neural network, wherein the neural network has multiple layers at which the video being analyzed is processed, and at different layers of the neural network, different types of information (such as spatial information, spatio-temporal information, and so on) from the video are tapped, which together aid in data extraction from the video. Architecture of the neural network is depicted in the FIG. 2.

The communication interface(s) (103) can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) (103) can include one or more ports for connecting a number of devices to one another or to another server.

The memory (101) may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more components (not shown) of the system (100) can be stored in the memory (101). The memory (101) is configured to store a plurality of operational instructions (or 'instructions') which when executed cause one or more of the hardware processor(s) 102 to perform various actions associated with the video analysis being performed by the system (100). The system (100) can be implemented in a variety of ways as per requirements. Various steps involved in the process of capturing spatio-temporal representation, video object segmentation, video reconstruction being performed by the system (100) are explained with description of FIGS. 7-11. All the steps in FIG. 7 to FIG. 11 are explained with reference to the system of FIG. 1 and the neural network architecture of FIG. 2.

Figure 2:
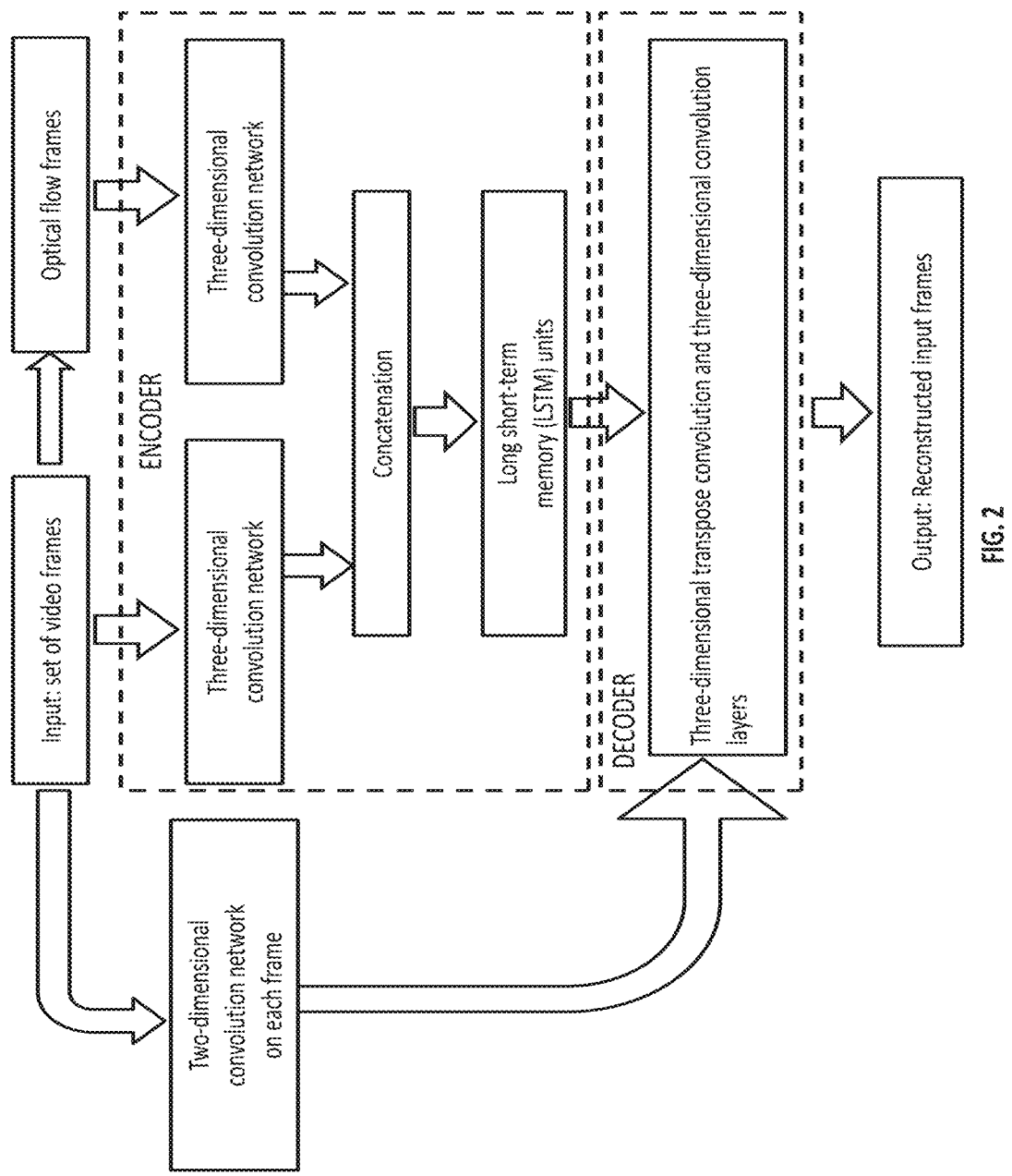
FIG. 2 is a functional block diagram depicting architecture of a neural network used by the system of FIG. 1, to capture spatio-temporal representation, according to some embodiments of the present disclosure.

FIG. 2 is a functional block diagram depicting architecture of a neural network used by the system of FIG. 1, for the video reconstruction, according to some embodiments of the present disclosure. The neural network has a plurality of layers namely an input layer, a 2D convolution layer, a 3D convolution layer, a Long-Short Term Memory (LSTM) layer, and a combination of a predefined layers of a 3D transpose convolution unit and a 3D convolution unit. The neural network is configured to tap different information from an input video being processed/analyzed, during the video object segmentation process.

Figure 3:
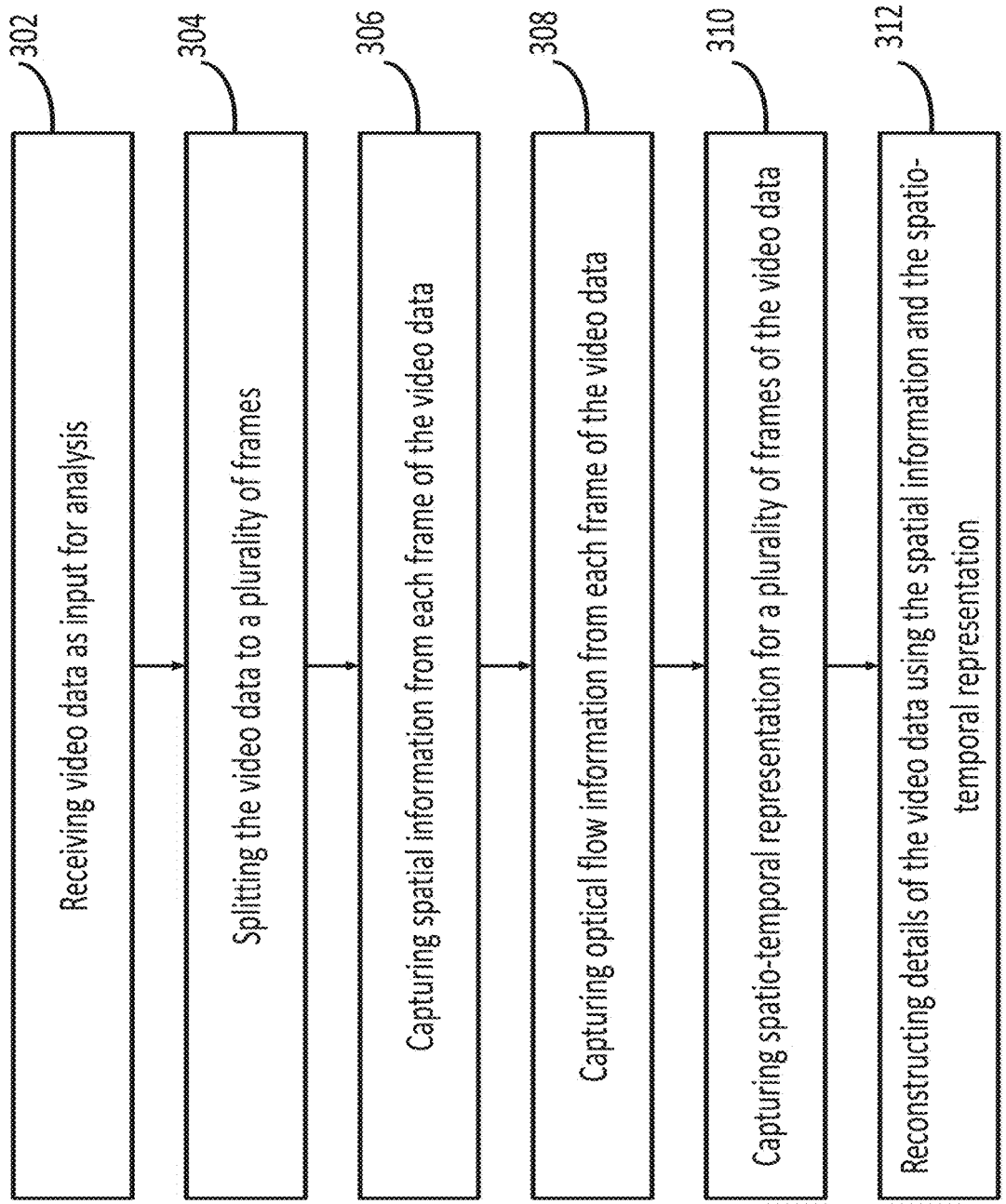
FIG. 3 is a flow diagram depicting steps involved in the process to capture spatio-temporal representation for video reconstruction and analysis using the system of FIG. 1, in accordance with some embodiments of the present disclosure.

Data processing using the neural network is now explained with reference to the steps depicted in FIG. 3. The system (100) collects (302) a video input, which is to be analyzed for capturing spatio-temporal representation and further the video reconstruction. The input video is split 304 to a plurality of frames of a predefined fixed length and are processed by an individual input blocks in the input layer, such that each input block processes one frame at a time. The input blocks may pre-process the frames to condition the frames for further processing. The pre-processed data (i.e. the frames) from each of the input blocks are fed as input to a corresponding 2D convolution network to capture (306) spatial information from multiple continuous frames, wherein the number of continuous frames selected and processed together is pre-defined based on application. Simultaneously, the neural network also captures (308) optical flow information from each frame of the video data. Further, the neural network captures (310) spatio-temporal representation from each frame of the video input by processing each frame using an encoder network. Herein, the encoder network includes a 3D convolution unit and a corresponding Long Short-Term Memory (LSTM). The 3D convolution unit network captures a first set of spatio-temporal features by processing the predefined sequence of video frames and captures a second set of spatio-temporal features by processing the captured optical flow information of the predefined sequence of video frames. It is to be noted that the first set and the second set of spatio-temporal features are of short-term. Therefore, the encoder network concatenates the captured first set and second set of spatio-temporal features to get combined spatio-temporal information of the predefined sequence of video frames and processes the combined spatio-temporal information using a Long Short-Term Memory (LSTM) unit network to capture a spatio-temporal representation spanning a longer duration.

It would be appreciated that the captured spatio-temporal representation of each frame of the video is fed as input to the decoder network for video reconstruction (312). A 3D convolution unit of the decoder network process the captured spatio-temporal representation via a combination of a predefined layers of a 3D transpose convolution unit and a 3D convolution unit. Further, the captured spatial information is concatenated as skip connections in the deconvolution layers of the decoder network.

Figure 4:
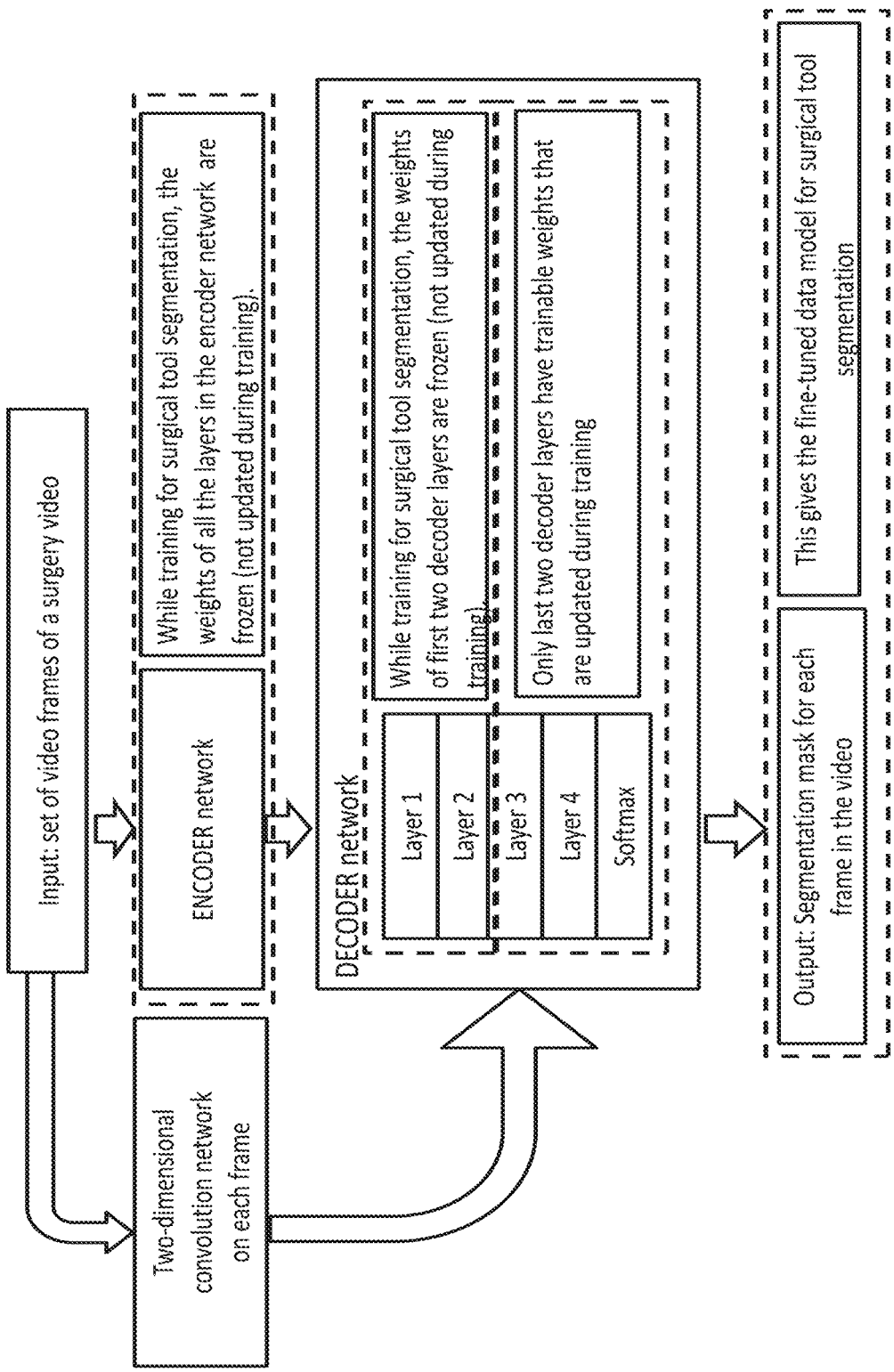
FIG. 4 is a flow diagram depicting steps involved in the process of generating segmentation mask to fine-tune data model for surgical tool segmentation from a surgery video, in accordance with some embodiments of the present disclosure.

Steps involved in the process of extracting (310) the spatio-temporal representation are depicted in FIG. 4. The 3D convolution unit network captures a first set of spatio-temporal features from the predefined sequence of video frames. The captured first set of spatio-temporal features is of a first-time duration. The 3D convolution unit network further captures a second set of spatio-temporal features from by processing captured optical flow information of the predefined sequence of video frames. The system (100) then concatenate the captured first set and second set of spatio-temporal features to get combined spatio-temporal information of the predefined sequence of video frames. Further, the combined spatio-temporal information processed by a Long Short-Term Memory (LSTM) unit network to capture a spatio-temporal representation of each frame of the video input and that spans a second time duration. It is to be noted that the second time duration is longer than the first-time duration. The first-time duration is of short-term and the second time duration spans more than a second.

Data processing using the neural network is such that different types of information (such as temporal information, spatial information, and the spatio-temporal information) are tapped at different layers of the neural network. This information can be then used for training the neural network further, and output data generated by the neural network can be used to generate a data model, which can be used for video object segmentation. The neural network can be trained end-to-end for both Zero-shot video object segmentation and One-shot segmentation. Herein, the system (100) divides the spatio-temporal information into spatial information defined at a frame level. The system (100) further divides the spatio-temporal information into spatio-temporal representation. The system (100) captures spatial information of the plurality of frames from the spatial information defined at the frame level using a 2D convolution neural network (such as ResNet) and feeds to a 3D transpose convolution neural network (such as Inflated Inception 3D or I3D). It would be appreciated that the 3D transpose convolution, deconvolution dilated convolution and upsampling layers are hereinafter used interchangeably. The captured spatial information is concatenated to one or more predefined layers of the transpose convolution neural network. The system (100) then generates a data model using the spatial information captured from the spatial information defined at the frame level, and the spatio-temporal representation of each frame of the video. It would be appreciated that the data model is fine-tuned using this approach, every time new information is processed by the system (100).

Figure 5:
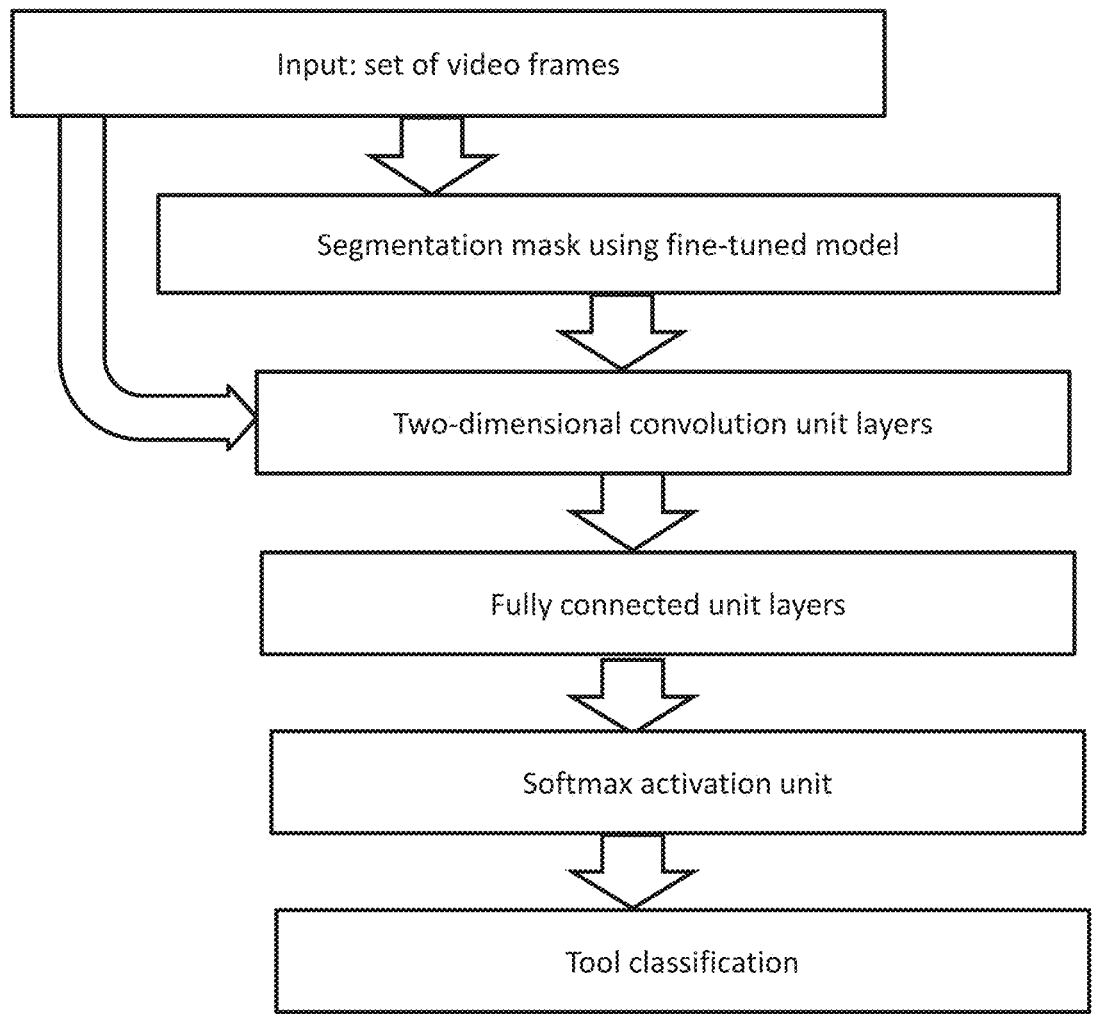
FIG. 5 is a flow diagram depicting steps involved in the process of surgical tool classification, in accordance with some embodiments of the present disclosure.

In another embodiment, a processor implemented method and system for segmentation and classification of a plurality of surgical tools used in a surgery is provided. Steps involved in the process of segmentation and classification are depicted in FIGS. 4 & 5. A pre-trained neural network receives (402) a video of the surgery as an input data, the video of a surgery comprising a plurality of video frames as shown in FIG. 4. The received video is split (404) into a plurality of video frames of fixed length and in a predefined sequence. A pre-generated data model is fine-tuned (406) for the segmentation of the plurality of surgical tools. Further, the pre-trained neural network generates (408) a segmentation mask for each of the plurality of the video frames and for each of the plurality of surgical tools based on the fine-tuned data model. The pre-trained neural network is further trained (410) to classify the plurality of surgical tools using one or more 2D convolution unit layers and one or more fully connected unit layers that make use of the generated segmentation mask to classify the plurality of surgical tools in each of the plurality of video frames. And finally, the trained neural network classifies (412) each of the plurality of surgical tools from each frame of the surgery video as shown in FIG. 5.

Herein, the fine tuning of the pre-generated data model for segmentation of the plurality of surgical tools includes freezing, via the one or more hardware processors, one or more model weights of each layer of the encoder network and predefined layers of the decoder network. Further, one or more layers of the 3D convolution unit and a softmax activation unit are added to the pre-trained neural network, to map spatio-temporal representation to tool segmentation masks for each of the plurality of input video frames as shown in FIG. 4. and FIG. 5, one or more model weights of unfrozen layers and the added one or more layers during training are updated to generate the fine-tuned data model. It is to be noted that the softmax activation function takes as input a vector, and applies a normalized exponential function given by the equation below, to normalize the values into a probability distribution.

$$\frac{e^{v_m}}{\sum_{m=1}^{k} e^{v_m}} \quad (1)$$

wherein vector v of K different values.

Figure 6:
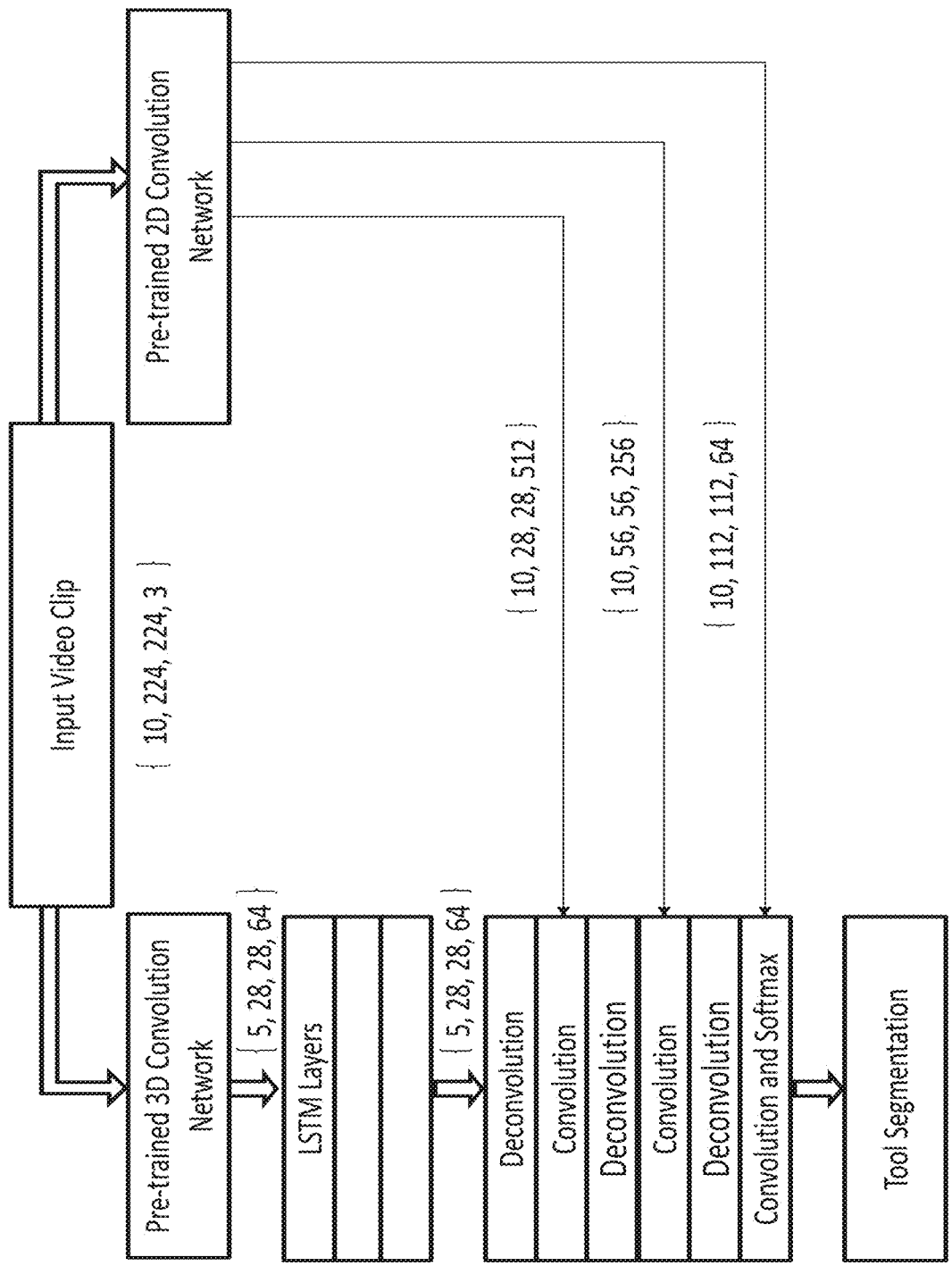
FIG. 6 is a schematic architecture of a neural network depicting steps involved in the process of tool segmentation and detection, in accordance with some embodiments of the present disclosure.

Referring FIG. 6, a schematic architecture of a neural network to detect the plurality of surgical tools from the surgery video. Herein, a variation of LSTM called spatio-temporal LSTM (ST-LSTM) unit is used based on the results obtained from each frame prediction and early video action recognition. The input to the neural network is a video comprising N consecutive video frames and the output is the tool detection and segmentation in each of the N frames. In order to capture spatio-temporal features, using a pre-trained 2D convolution network (such as ResNet) and a pre-trained 3D convolution network (such as I3D) are used. Herein, two types of features, frame level ResNet features and video-level I3D features, are extracted and to capture spatio-temporal variations, LSTM layers are placed after the I3D block. Further, four ST-LSTM layers with filter sizes (128, 64, 64, 64) follows in the network to map output back to the input using the decoder network. Output of the ResNet block are tapped at three levels and pass them as skip connections that are concatenated with intermediate layers outputs in the decoder network. The output of the final transpose convolution layer is passed to a convolution layer with softmax activation for N outputs.

Experimental Results:

Herein, a first experiment is of a video reconstruction using an encoder-decoder framework. An array of deep learning components and corresponding variant are used as building blocks and a number of architectural possibilities are explained below.

Figure 7:
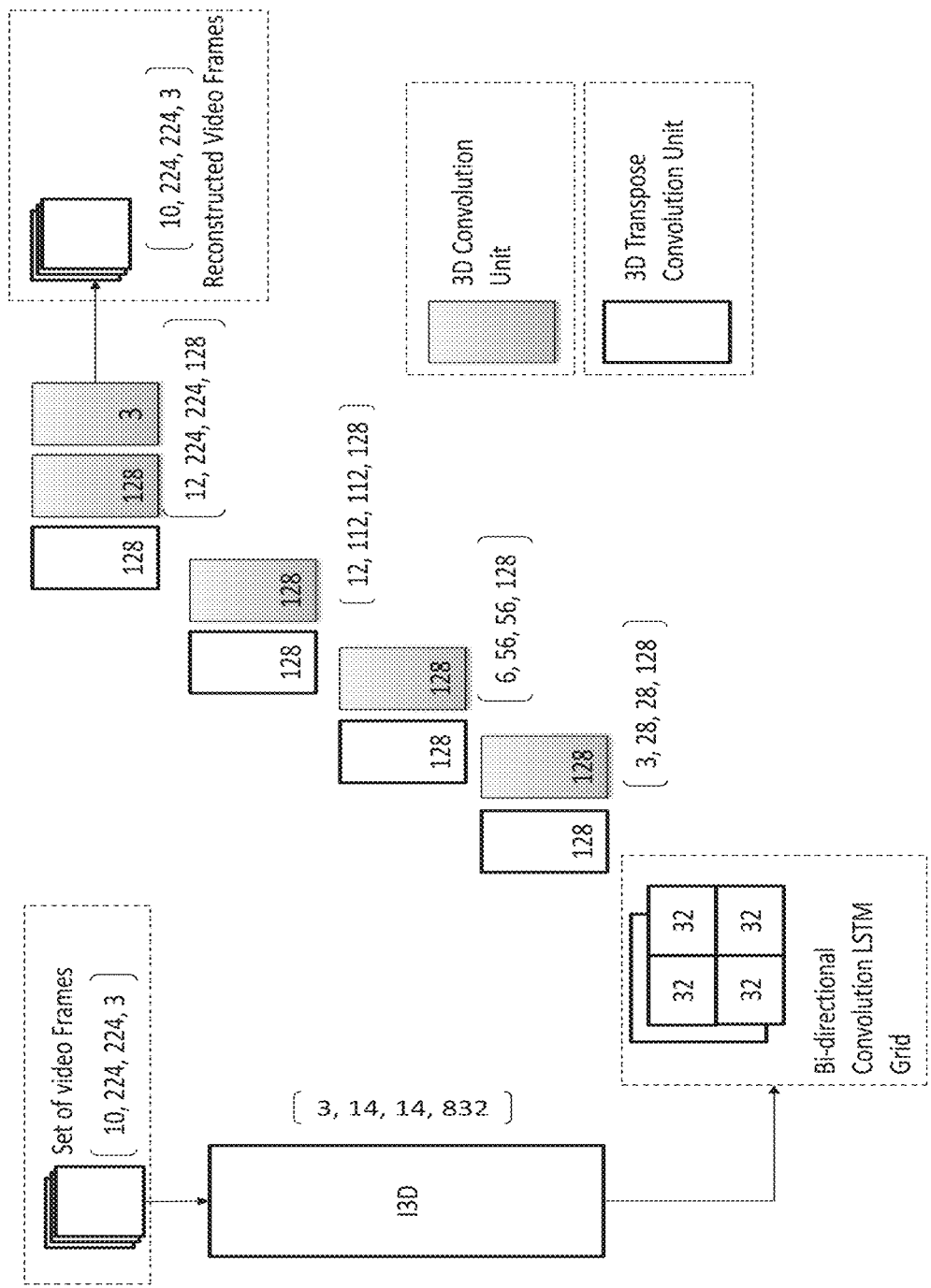
FIGS. 7 to 11, are schematic architectures, depicting variations of neural network for video reconstruction performed using FIG. 1 of the system, in accordance with some embodiments of the present disclosure.

A first network architecture includes an inception three-dimensional (I3D) model as shown in FIG. 7. The network follows a framework of a 3D convolution and a 3D deconvolution layers and a LSTM for capturing spatio-temporal information. The plurality of video frames is given to the I3D model, which is pre-trained on both ImageNet and Kinetics datasets. The I3D network performs a 3D convolution on the input, thereby capturing spatio-temporal variation features of the plurality of video frames. The output of the I3D model is given to a 2D LSTM grid. It would be appreciation that each block in the LSTM grid consists of two LSTM layers to capture long-term spatio-temporal information. The LSTM output of each block of the LSTM grid are concatenated to one or more predefined layers of I3D model. Further, a 3D transpose convolution layers and a 3D convolution layers are used to retrieve one or more details of the original plurality of video frames.

Figure 8:
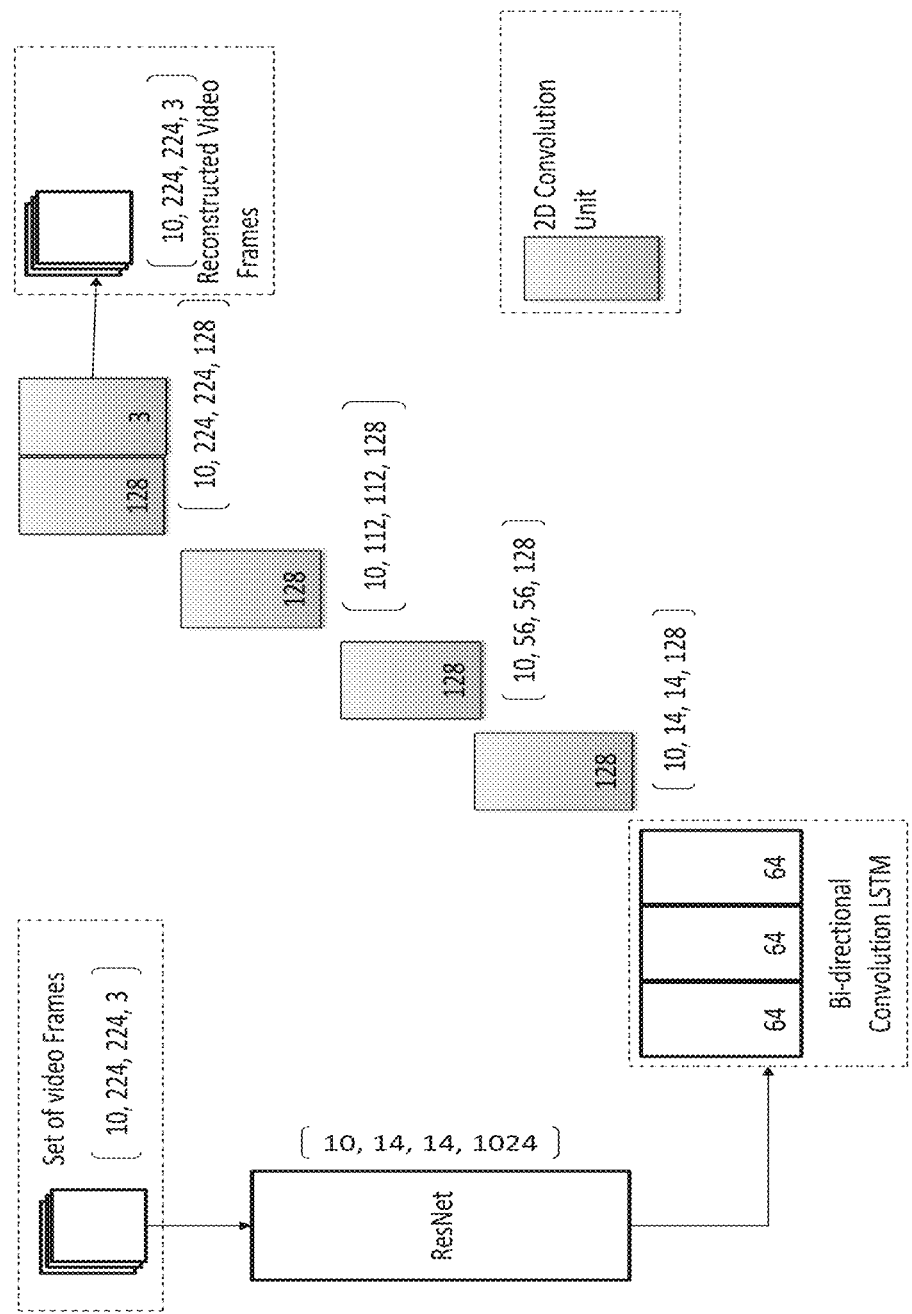

Referring FIG. 8, schematic architecture, wherein a ResNet is used as a pre-trained model along with a 2D convolution unit. Output of the ResNet are concatenated and input into a bi-directional 2D convolutional LSTM layer. The LSTM output is input to a 2D deconvolution unit layers, consisting of 2D convolution and 2D deconvolution layers to retrieve one or more details of the original plurality of video frames.

Figure 9A:
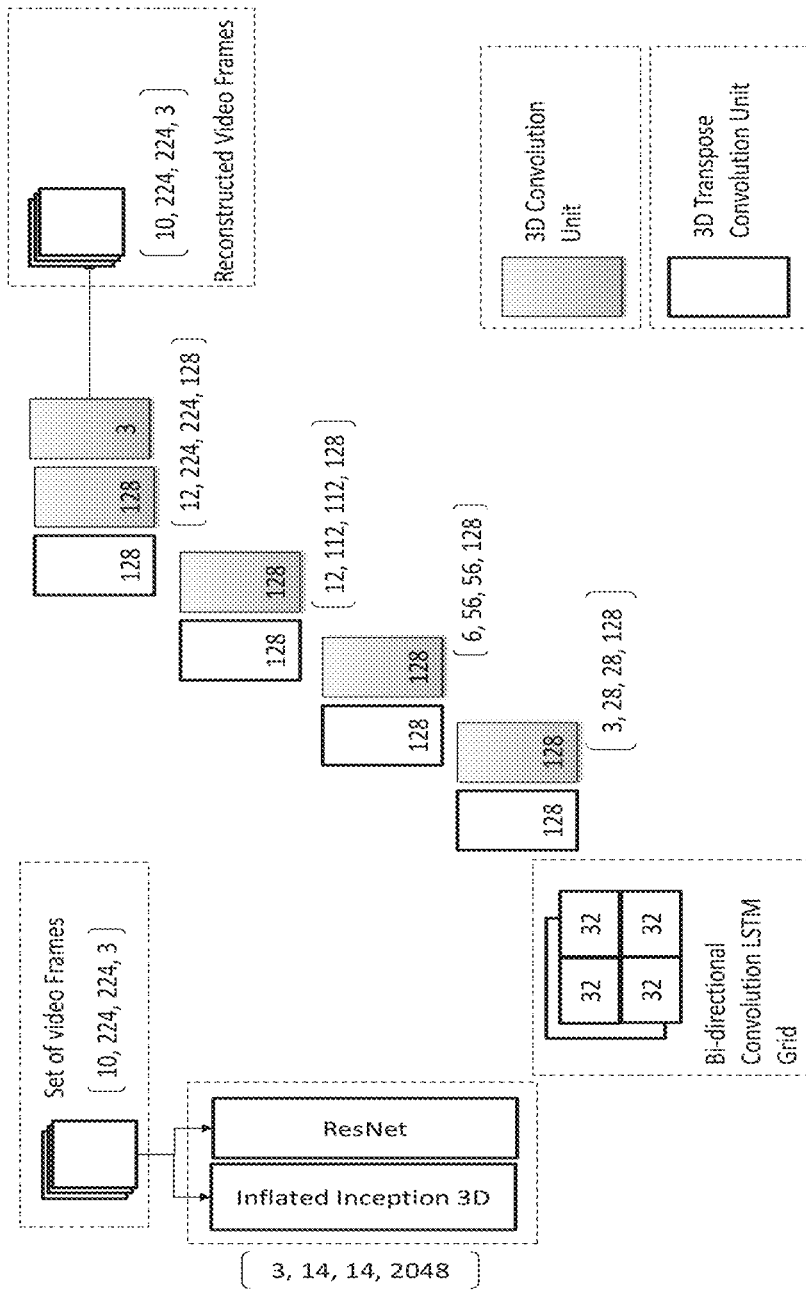
Figure 9B:
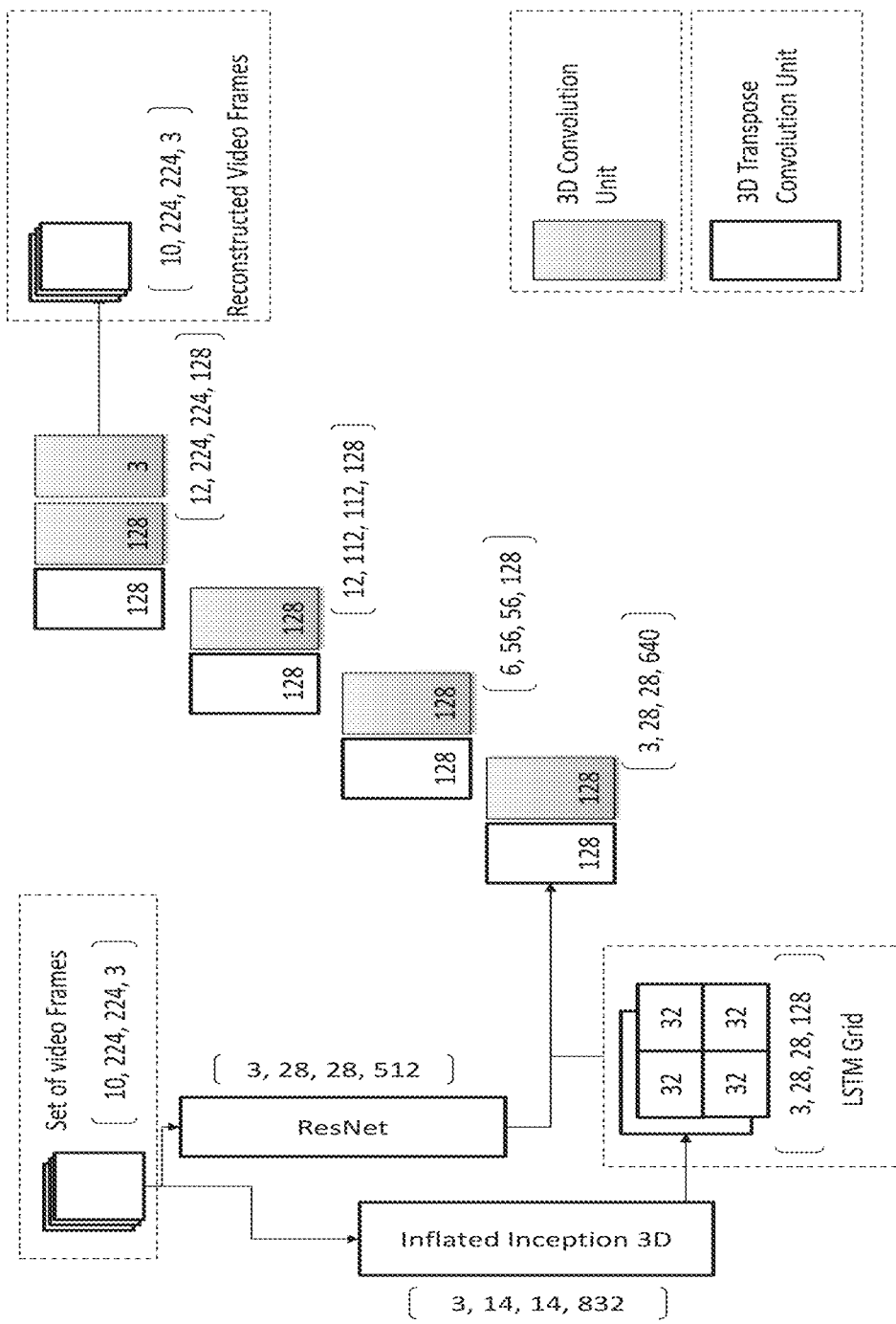

Referring FIG. 9(*a*) & (*b*), schematic architecture, wherein a combination of both I3D and ResNet is used for video object segmentation. The video input is given to the combination to capture a spatial information and a spatio-temporal information. It would be appreciated that as shown in FIG. 9(*a*) output of ResNet and I3D is combined before feeding it into the LSTM. Further, the output of the LSTM is combined with ResNet output before reconstructing as shown in FIG. 9(b). It is to be noted that the spatial information is captured well by an 2D convolution deep network and the spatio-temporal variation is captured in a 3D convolution unit.

Figure 10:
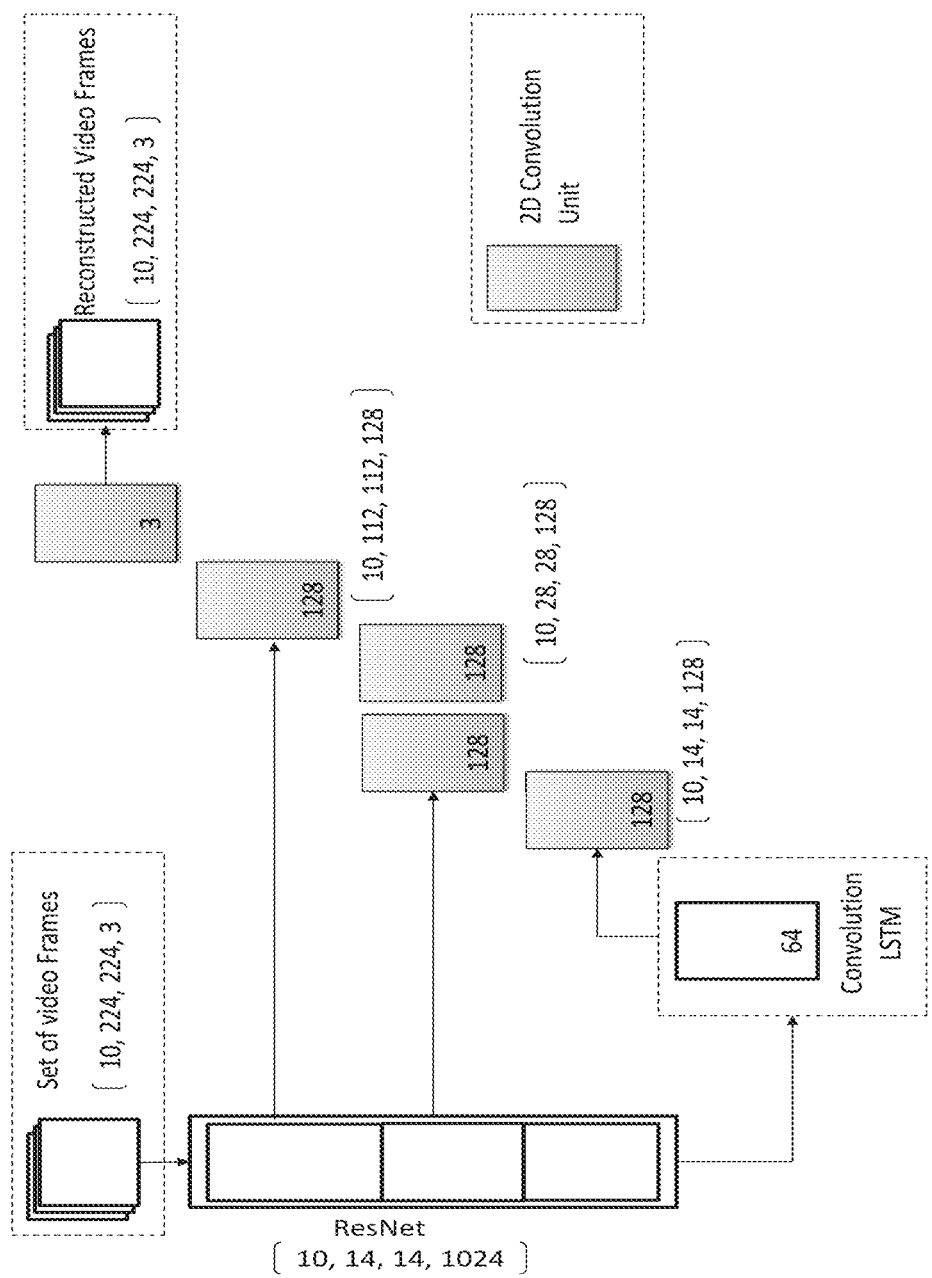

Referring FIG. 10, a schematic architecture, wherein the plurality of video frames of the video input is given to the ResNet to extract spatial information and to the LSTM for capturing the spatio-temporal variation. During reconstruction, an intermediate ResNet output is introduced as skip connections to one or more predefined layers in a 3D convolution unit. It would be appreciated that the ResNet unit captures spatial features that requires frame-level output such as a video frame prediction and video segmentation. The I3D model shows the ability to capture spatio-temporal variations but is unable to get back to the original video frames on its own. Further, the spatio-temporal information captured is limited to short-term often smaller than the actions defined in any datasets.

Figure 11:
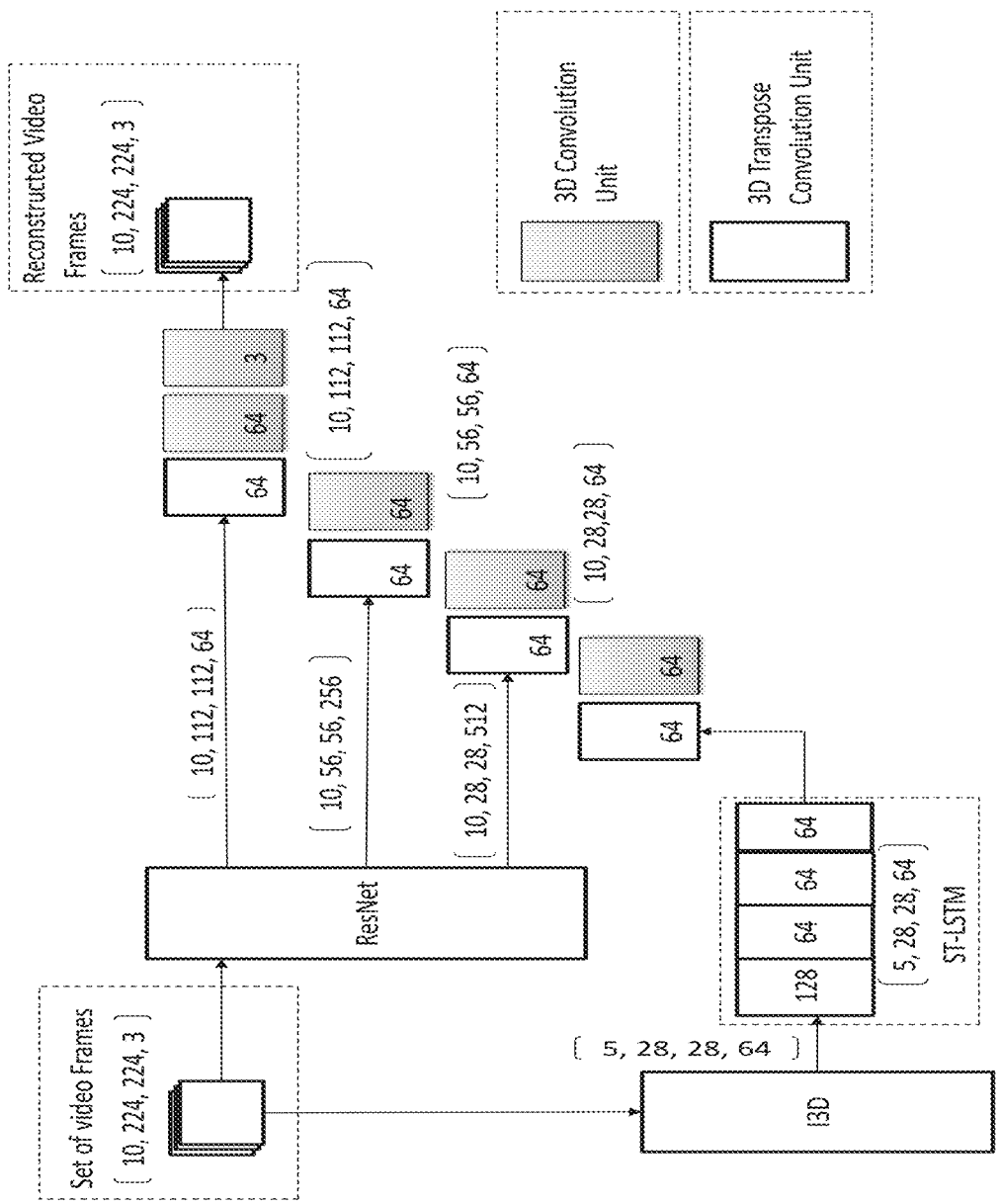
Figure 12:
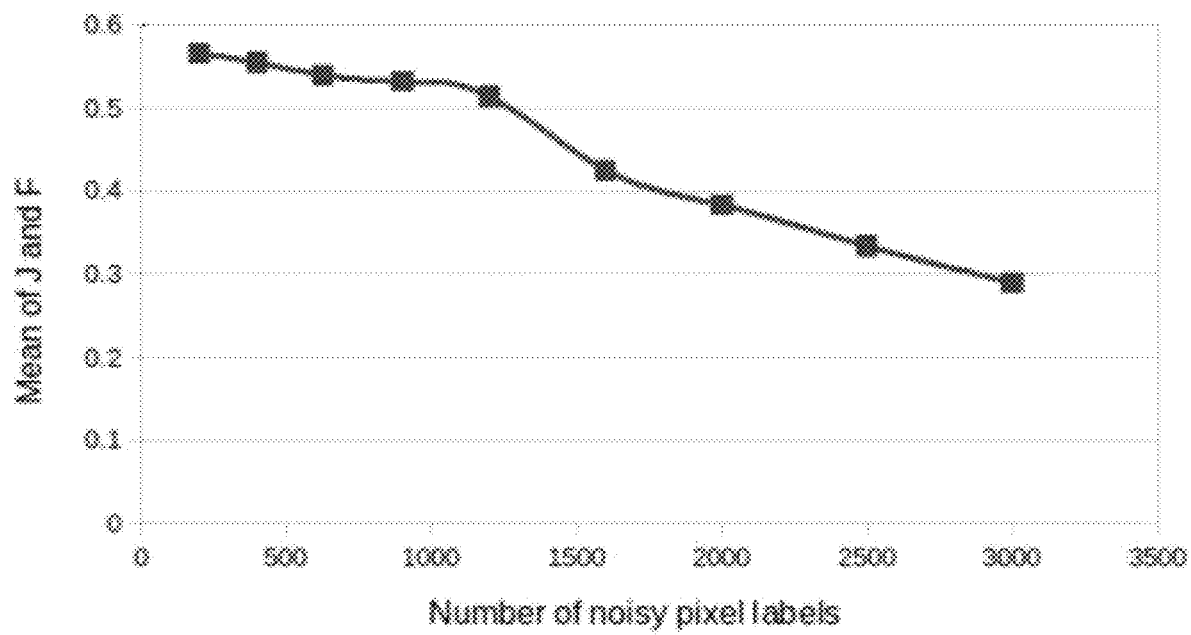
FIG. 12 is a schematic graph showing variation for one-shot video object segmentation with increase in noisy label pixels in the first frame of segmentation mask, in accordance with some embodiments of the present disclosure.

In one example, wherein a something-something-V2 action recognition dataset is used for training a neural network for a video object segmentation and video reconstruction. The dataset contains over five lakh videos of mainly humans performing basic actions from a list of 174 action classes. The list of action classes in this dataset are highly challenging as it involves atomic actions such as pushing and pulling (moving left to right vs moving right to left of the frame), picking and placing (moving top to bottom vs moving bottom to the top of the frame). Herein, a training set of ten thousand videos from this dataset is used with a training, validation, and test ratio of 0.8:0.1:0.1. An Adam optimizer and a mean square error (MSE) loss is used to train the neural network for one thousand epochs. The reconstruction results as shown in FIG. 11, wherein a framewise ResNet encoder network captures spatial features and a LSTM takes the individual frame output at each timestep and captures the spatio-temporal representation. Along with skip connections from ResNet immediate outputs, the network reflects a good reconstruction performance.

In yet another embodiment, wherein an architecture is proposed for spatio-temporal video object segmentation (ST-VOS) network using the ResNet, I3D and the LSTM as shown in FIG. 11. Herein, the input to the ST-VOS network is a set of ten RGB frames of size (10, 224, 224, 3). The input is processed via a I3D model and an intermediate output of size (5, 28, 28, 64) is extracted. The output of the I3D model is given as input to an ST-LSTM sub-network, consisting of four layers with filter sizes as shown in FIG. 11. Further, the intermediate outputs are collected and then feed it to a 3D deconvolution sub-network consisting of 3D convolution layers and 3D transpose convolution layers. The video frames input is parallelly passed through the ResNet and the outputs at multiple levels are captured. This is input to the corresponding levels in the deconvolution block to compute the final object segmentation map.

Zero-Shot Video Object Segmentation (VOS): For an unsupervised video object segmentation, the neural network is trained on a binary object segmentation mask of a set of videos and evaluate the trained neural network on unseen test videos containing both similar objects and new objects. It is to be noted that the neural network is pre-trained on the Something-Something-V2 datasets for video reconstruction and last four layers are fine-tuned for video object segmentation. In one example, as shown in FIG. 11, wherein a dataset consists of 60 training video sequence and 30 testing video sequences is used for Zero-shot VOS. Every frame of the dataset is annotated with one or more objects. Most of the video sequences contain an average of 70 frames and are of resolution 3840×2160, but herein the video frames are down-sampled version of 480-pixel resolution (720×480).

Further, the neural network is trained according to the network configuration as shown in FIG. 11 taking ten frames at a time. From the training set of 60 video sequences, 600 frame samples are generated to form the training dataset. It is to be noted that the weights of the pre-trained I3D model and the ResNet model are frozen during training. Output of these model on test video samples shows that the segmentation becomes better with the addition of 3D convolution networks. Features of the I3D model show great capability in capturing spatio-temporal features and there is only slight improvement in the performance after adding spatio-temporal (ST)-LSTM layers to I3D features.

One-Shot Video Object Segmentation (VOS): Herein, object segmentation mask of the first frame is incorporated into the neural network by feeding it along with the ResNet output to the deconvolution sub-network. Further, resizing the segmentation mask to match the ResNet intermediate outputs tapped at two levels of the neural network. At each scale, the intermediate output of the ResNet are concatenated with the deconvolution layer outputs and input to the next layer. Further, for the one-shot VOS, the mask of the first frame of the above trained neural network is concatenated with the ResNet skip connections at different scales, and the network is trained with an Adam optimizer and a cross-entropy loss computed over the rest of the nine frames.

Further, a quantitative evaluation of the network variations, a standard matrix is computed with Mean Jaccard (J) index, and Mean boundary F-score (F). Performance of the proposed neural network is compared for both zero-shot VOS and one-shot VOS with other one-shot VOS (based on 2D convolution network), recurrent video object segmentation RVOS (based on the 2D convolution and LSTM network) and CorrFlow (a self-supervised approach using pixel correspondence matching) as summarizes in below table 1. Herein, the quantitively results of the proposed neural network for one-shot VOS shows comparable performance with online training method OSVOS and does better than the state-of-art self-supervised approach. Using ST-LSTM instead of convolutional LSTM boosts performance as seen by the performance of RVOS.

TABLE 1

| Method | Zero shot | | One-shot | |
|---|---|---|---|---|
| Metric | J | F | J | F |
| RVOS | 23.0 | 29.9 | 48.0 | 52.6 |
| CorrFlow | — | — | 48.4 | 52.2 |
| OSVOS | — | — | 56.6 | 63.9 |
| ST-VOS without I3D | 31.6 | 34.2 | — | — |
| ST-VOS without ST-LSTM | 42.9 | 43.9 | — | — |
| ST-VOS | 43.2 | 44.7 | 52.9 | 60.4 |

One-shot VOS with Noisy Labels: A noisy object mask is given to the proposed neural network to evaluate the robustness of features captured by one-shot VOS network. Object annotations are modified by extracting different size object bounding boxes from the pixel annotation and by small random translations on the extracted bounding box masks. The neural network is trained on the same video set but with these modified annotations and observe the deterioration in performance with an increase in noise. Referring FIG. 12, it plots the change in J and F with the increase in wrong labels.

Assuming that on an average, an object occupies one-fifth of an image and considering an image size of (224×224), 1200 noisy pixels correspond to about 12% of the object. It would be appreciated that the performance of the network, given a mask with 12% noisy pixels is as good as that given an accurate object mask. Furthermore, on time complexity for video object segmentation of frames of size (224, 224, 3), the proposed ST-VOS network takes 56 millisecond (ms) per frame on a Tesla K80 GPU. Herein, the time taken for training each network for 7000 iterations for a training set of 600 video segments with 10 frames each is about 15 hours.

Figure 13:
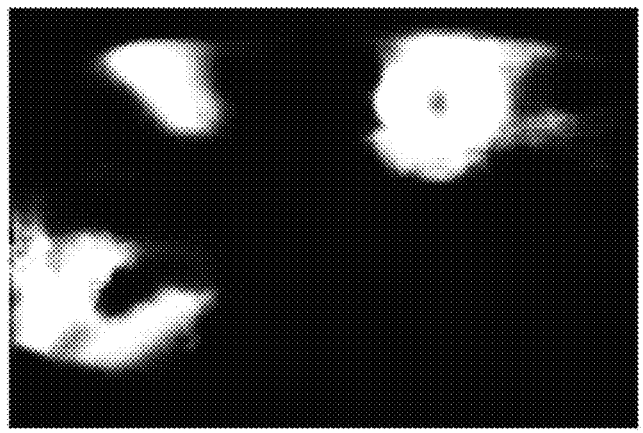
FIGS. 13(*a*) & (*b*) depict examples of surgical tool segmentation and detection performed by the neural network using FIG. 4, in accordance with some embodiments of the present disclosure.
Figure 13:
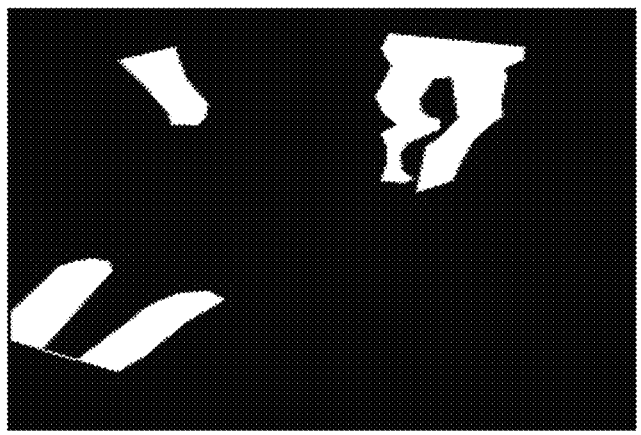
Figure 13:
Figure 13:
Figure 13:
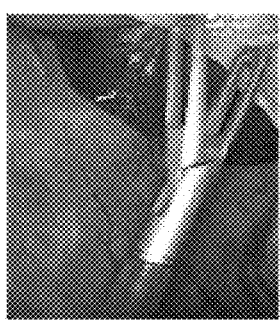
Figure 13:
Figure 13:
Figure 13:
Figure 13:
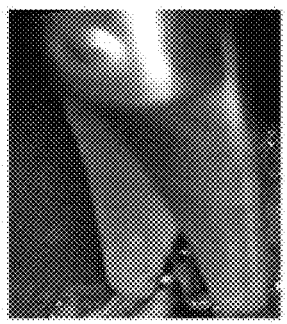
Figure 13:
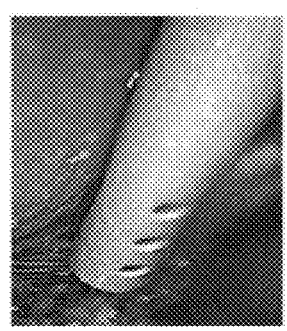

In another example, as shown in FIG. 13(a) & (b) (collectively referred hereinafter FIG. 13), wherein a plurality of surgical tools segmentation and classification using the pre-trained neural network is provided. It is to be noted that the images of the FIG. 13 are taken from a publicly available database. It is used only for illustrative purpose. A Cholec80 dataset contains 80 videos with a resolution of 854×480 px of cholecystectomy is given as input to the pre-trained neural network as mentioned in FIG. 4. The phase annotation is provided for all the frames at 25 frames per second (fps), whereas tools are annotated at one per 25 frames leading to 1 fps annotation rate on a 25-fps video. The whole dataset is labeled with the phase and tool presence annotations. Herein, the Cholec80 dataset uses 7 surgical tools for performing cholecystectomy surgeries. The tools are shown in FIG. 13(b). The tools used are grasper, bipolar, hook, scissors, clip applier, irrigator, and specimen bag. To enable instance segmentation, frames at 3 fps are extracted and created masked ground-truth with only the tool region (non-bounding box) using LabelMe annotation tool for 10 randomly chosen videos. The sequence of frames is carefully selected to include every tool and its variations. For each tool, there are 15 variations of short sequence videos with 10 frames. Out of 15, 12 variations of each tool are used for training and 3 variations for testing. short videos are also included, which do not have any tool, both in our training and testing dataset. This results in a total of 960 image frames for training and 250 image frames for testing. To reduce the memory the proposed network resizes these videos to (224×224). Few frames in our training set contains multiple tools, a scenario quite common in laparoscopic surgeries.

For quantitative evaluation of the proposed method for tool segmentation and classification, the mean average precision (mAP) for a range of Intersection-over-Union (IoU) thresholds between 0.2 to 0.7 are calculated, and the average value is computed. In terms of mAP score for tool segmentation, proposed method achieves an mAP score 0.82, an improvement of about 6% over 2D region-based convolution networks (RCNN), and an improvement of about 18% over 2D convolution networks (such as Unet). For frame-level tool classification, an improvement of about 5% in mAP score compare to 2D convolution networks is achieved.

TABLE 2

|  | Proposed Network | Unet | Mask R-CNN |
|---|---|---|---|
| Bipolar | 0.86 | 0.61 | 0.71 |
| Clipper | 0.72 | 0.45 | 0.82 |
| Grasper | 0.90 | 0.85 | 0.94 |
| Hook | 0.48 | 0.20 | 0.80 |
| Scissor | 0.93 | 0.79 | 0.97 |
| Irrigator | 0.84 | 0.78 | 0.67 |
| Bag | 0.96 | 0.81 | 0.40 |
| Mean Average Precision (mAP) | 0.82 | 0.64 | 0.76 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of capturing spatio-temporal representation of a video as a video reconstruction. The embodiment thus provides a mechanism of video object segmentation in which information from a video is extracted at various levels of a neural network. Moreover, the embodiments herein further provide design of a spatio-temporal video object segmentation network based on the reconstruction results obtained earlier. The neural network is successfully implemented for the application of zero-shot and one-shot VOS, respectively.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include each hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method (300) for video analysis to capture a spatio-temporal representation comprising:
    receiving (302), via one or more hardware processors, a video as an input data, wherein the received video comprising a plurality of video frames;
    splitting (304), via the one or more hardware processors, the received video into the plurality of video frames of fixed length, wherein the plurality of video frames of fixed length is in a predefined sequence;
    capturing (306), via the one or more hardware processors, a spatial information for each of the plurality of video frames, by processing the predefined sequence of video frames, using a two-Dimensional (2D) convolution network;
    capturing (308), via the one or more hardware processors, an optical flow information for each of the plurality of video frames; encoding (310), via the one or more hardware processors, the plurality of video frames of fixed length to capture spatio-temporal representation of the plurality of video frames using an encoder network, wherein the encoder network is:
        processing, via a three-dimensional (3D) convolution unit network, the predefined sequence of video frames to capture a first set of spatio-temporal features, wherein the 3D convolution unit network captures the spatio-temporal features of a first-time duration;
        processing, via the 3D convolution unit network, the captured optical flow information of the predefined sequence of video frames to capture a second set of spatio-temporal features, wherein the 3D convolution unit network captures the spatio-temporal features of the first-time duration;
        concatenating, via the one or more hardware processors, the captured first set and second set of spatio-temporal features to get a combined spatio-temporal information of the predefined sequence of video frames; and
        processing, via the one or more hardware processors, the combined short-term spatio-temporal information to capture a spatio-temporal representation spanning a second-time duration using a Long Short-Term Memory (LSTM) unit network, wherein the second-time duration is longer then the first-time duration;
    reconstructing (312), via the one or more hardware processors, one or more details of each frame of the input video from the captured spatio-temporal representation and the captured spatial information using a decoder network, wherein the decoder network is:
        processing, via the one or more hardware processors, the captured spatio-temporal representation using a combination of a 3D transpose convolution unit layers and a 3D convolution unit layers to map the captured spatio-temporal representation to each frame of the video; and
        concatenating, via the one or more hardware processors, the captured spatial information from 2D convolution unit network to one or more predefined layers of the decoder network.

2. The processor-implemented method (300) of claim 1, wherein the 3D convolution unit network captures one or more variations of the spatio-temporal information of the plurality of video frames.

3. The processor-implemented method (300) of claim 1, wherein a neural network is trained using the spatio-temporal representation extracted from the received video by:
    dividing, via the one or more hardware processors, the spatio-temporal representation into spatial information defined at a frame level;
    dividing, via the one or more hardware processors, the spatio-temporal representation into spatio-temporal information spanning the second-time duration;
    capturing, via the one or more hardware processors, spatial information of the plurality of frames from the spatial information defined at the frame level using the 2D convolution network;
    feeding, via the one or more hardware processors, the captured spatio-temporal representation to a transpose 3D convolution neural network;
    concatenating, via the one or more hardware processors, the captured spatial information to one or more predefined layers of the transpose 3D convolution neural network; and
    generating, via the one or more hardware processors, a data model using the captured spatial information and the captured spatio-temporal representation.

4. A processor implemented method for segmentation and classification of a plurality of surgical tools used in a surgery, comprising:
    receiving, via one or more hardware processors, a video of the surgery as an input data, wherein the video of the surgery comprising a plurality of video frames;

splitting, via the one or more hardware processors, the received video to the plurality of video frames of fixed length, wherein the plurality of video frames of fixed length is in a predefined sequence;

fine-tuning, via the one or more hardware processors, pre-generated data model for segmentation of the plurality of surgical tools by:

freezing one or more model weights of each layer of the encoder network and predefined layers of the decoder network;

adding one or more layers of the 3D convolution unit and a softmax unit to the neural network, to map spatio-temporal representation to tool segmentation masks for each of the plurality of input video frames; and updating one or more model weights of unfrozen layers and the added one or more layers during training, to generate a fine-tuned data model;

generating, via the one or more hardware processors, segmentation mask for each of the plurality of the video frames and for each of the plurality of surgical tools using the fine-tuned data model;

training, via the one or more hardware processors, a neural network to classify the plurality of surgical tools by using:

one or more 2D convolution unit layers; and one or more fully connected unit layers that make use of the generated segmentation mask to classify the plurality of surgical tools in each of the plurality of the video frames; and classifying, via the one or more hardware processors, each of the plurality of surgical tools using the trained neural network.

5. A system (100) for video analysis to capture a spatio-temporal representation comprising:

one or more hardware processors (102);

one or more communication interfaces (103); and a memory (101), wherein the memory comprises a plurality of instructions, which when executed, cause the one or more hardware processors to:

receive a video as an input data, wherein the received video comprising a plurality of video frames;

split the video to the plurality of video frames of fixed length, wherein the plurality of video frames of fixed length is in a predefined sequence;

capture a spatial information for each of the plurality of video frames, by processing the predefined sequence of video frames, using a two-Dimensional (2D) convolution network;

capture an optical flow information for each of the plurality of video frames;

capture spatio-temporal representation of the plurality of video frames using an encoder, wherein the encoder comprising:

a 3D convolution unit network to capture a first set of spatio-temporal features by processing the predefined sequence of the plurality of video frames, wherein the captured first set of spatio-temporal features is of a first-time duration;

a 3D convolution unit network to capture a second set of spatio-temporal features by processing the captured optical flow information of the plurality of video frames, wherein the captured second set of spatio-temporal is of the first-time duration;

concatenate the captured first set of spatio-temporal and the captured second set of spatio-temporal features to get a combined spatio-temporal information of the predefined sequence of video frames;

a Long Short-Term Memory (LSTM) unit network to process the combined spatio-temporal information to capture a spatio-temporal representation spanning a second-time duration, wherein the second-time duration is longer than the first-time duration;

reconstruct one or more details from each of the plurality of video frames by feeding the captured spatio-temporal representation and the captured spatial information to a decoder network, wherein the decoder network:

process the captured spatio-temporal representation using a combination of a 3D convolution unit layers and a 3D transpose convolution unit layers of the decoder network to map the captured spatio-temporal representation to each frame of the video; and concatenate the captured spatial temporal information from 2D convolution unit network to one or more predefined layers of the decoder network.

6. The system (100) of claim 5, wherein a neural network is trained to capture spatio-temporal representation from the received video by:

dividing the spatio-temporal representation into spatial information defined at a frame level;

dividing the spatio-temporal representation into spatio-temporal information spanning a longer duration;

capturing spatial information of the plurality of frames from the spatial information defined at the frame level using a 2D convolution neural network;

feeding the captured spatio-temporal information to a transpose 3D convolution neural network;

concatenating the captured spatial temporal information to one or more predefined layers of the transpose 3D convolution neural network; and generating a data model using the captured spatial information and the captured spatio-temporal representation at the frame level to train the neural network.

7. The system (100) of claim 5, wherein the trained neural network captures spatio-temporal representation from a video input, comprising:

an input layer comprising a plurality of input blocks, wherein each of the plurality of input blocks collects a plurality of frames of fixed length of the video input and an optical flow information for each of the plurality of video frames;

a two-dimensional (2D) convolution network to capture a spatial information for each of the plurality of video frames, by processing the predefined sequence of video frames; and an encoder network to capture spatio-temporal representation of the plurality of video frames, wherein capturing the spatio-temporal representation comprising:

processing a three-dimensional (3D) convolution unit network, the predefined sequence of video frames to capture a first set of spatio-temporal features, wherein the 3D convolution unit network captures the spatio-temporal features of a first-time duration;

processing, via the 3D convolution unit network, the captured optical flow information of the predefined sequence of video frames to capture a second set of spatio-temporal features, wherein the 3D convolution unit network captures the spatio-temporal features of the first-time duration;

concatenating, via the one or more hardware processors, the captured first set and second set of spatio-temporal features to get combined spatio-temporal information of the predefined sequence of video frames; and
processing, via the one or more hardware processors, the combined spatio-temporal information to capture a spatio-temporal representation spanning a second-time duration using a Long Short-Term Memory (LSTM) unit network, wherein the second-time duration is longer than the first-time duration.

\* \* \* \* \*